United States Patent Office 3,077,461
Patented Feb. 12, 1963

3,077,461
CATALYZED EPOXIDE RESIN/EPOXIDIZED HY-
DROCARBON DRYING OIL GLOSS ENAMELS
AND METAL ARTICLES COATED THEREWITH
Everett D. Hood, Fairview Park, and Frank H. Jeffers,
Lakewood, Ohio, assignors to The Glidden Company,
Cleveland, Ohio, a corporation of Ohio
No Drawing. Filed Mar. 27, 1958, Ser. No. 724,223
10 Claims. (Cl. 260—30.4)

This invention relates to catalyzed epoxy coating compositions, especially enamels, which have been improved in respect to −65° F. bend resistance by including in their formulation small amounts of epoxidized mass-polymerized conjugated-diolefin-containing hydrocarbon drying oils. It relates also to metal articles coated with such improved coatings.

Epoxy gloss enamels catalyzed for curing with amines have been known for some time. However, such known formulations have been found to be wanting in respect to flexibility or bend resistance at low temperatures such as −65° F. We have now discovered that epoxidized hydrocarbon drying oils of the type described in the preceding paragraph unexpectedly impart good low-temperature bend resistance to such gloss enamels when blended with the latter in small amounts prior to curing.

Accordingly it is an object of this invention to provide improved amine-catalyzed epoxy coating compositions.

Another object is to provide improved low-temperature bend resistance in amine-catalyzed epoxy gloss enamels.

A further object is to provide an improved coating composition whose vehicle formulations include catalyzable epoxy film-forming material in combination with a small amount of mass-polymerized conjugated-diolefin-containing hydrocarbon drying oil which has been epoxidized.

Still another object is to provide metal articles coated with said improved coating compositions.

These and other related objects will be understood from the following description of the invention.

It is known that amine-cured epoxy resin coatings have poor bend resistance at low temperatures (e.g. −65° F.) and that when a cured film on metal is bent at such temperatures around a ½″ mandrel it either flakes off the metal substrate or becomes severely cracked. We have now found that excellent low temperature bend resistance can be obtained in such cured films by incorporating epoxidized hydrocarbon drying oil secured by epoxidation of mass-polymerized lower conjugated-diolefin-containing hydrocarbon drying oils. Such modified coatings can be prepared by combining the epoxidized drying oil with the epoxy resin component(s) in one package in the form of a homogeneous organic solvent solution, preferably pigmented to yield gloss enamel films when cured. The epoxy drying oil-epoxy resin blend can be cured by mixing it with suitable polyamine curing catalyst(s) and the resulting mixture should soon thereafter be applied to a desired substrate in the form of a film.

Amine-cured epoxy enamels have been found to exhibit many desirable film and protective qualities which are advantageous in aircraft coatings. Their use in this field, however, has been impaired by their poor low-temperature bend resistance. It was an unexpected and outright discovery to find that the epoxidized hydrocarbon drying oils identified supra and hereinafter possessed any qualities which would have the desired effect of improving the low-temperature bend resistance of the resulting coating composition.

The Epoxy Resin Component

The epoxy resin component can be one or more resinous materials preferably composed of polyether derivatives of one or more dihydric phenols with polyfunctional halohydrins, said derivatives containing epoxy groups and being free of functional groups other than epoxy and hydroxyl groups. The dihydric phenols and polyfunctional halohydrins are reacted in manners and proportions well understood in the art (for example, Greenlee Patent No. 2,521,911, of September 12, 1950) so as to form a complex epoxide resin of the type described above. Epichlorhydrin and glycerol dichlorhydrin are examples of polyfunctional halohydrins, while resorcinol and bisphenols are examples of dihydric phenols useful in forming such epoxide resins. Bisphenols may be prepared by methods such as are described in U.S. Patent 2,182,308 using phenol and various ketones having up to 6 carbons in each chain attached to the keto group.

The complex epoxide resins contemplated for use in my invention may have a wide range of functionality due to the relative proportions of epoxy and hydroxyl groups in the molecule. As is shown in subsequent examples, excellent coating compositions may be prepared in accordance with the invention by employing bisphenol-epichlorhydrin resins having an epoxide equivalent of from 170 to 3000, corresponding to an hydroxyl equivalent of 85 to 200. It is known that the epoxy equivalent weight or the epoxy-plus-hydroxy equivalent weight of any complex epoxide resin such as described above may be related somewhat to the "$n$" value of the formula which theoretically expresses the general chemical nature of the resins resulting from the condensation of a polyhydric phenol with epichlorhydrin. Such a formula is:

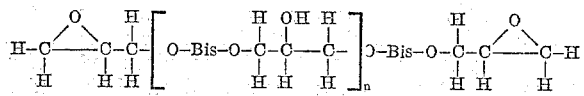

where —O—Bis—O— represents a dihydric phenolic residue such as the bisphenol residue:

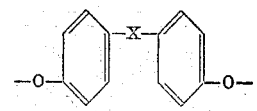

and wherein X is the hydrocarbon residue of any aliphatic or cycloaliphatic ketone of up to 6 carbons, inclusive, or is the group

in which R represents any alkyl, aryl or alicyclic group having up to 6 carbons and R' represents any alkyl group of up to 6 carbons, inclusive. The "$n$" value of the epichlorhydrin-bisphenol condensate may vary from about 0 to about 7 in resins which we have found to be satisfactory for use in preparing our compositions, but we prefer "$n$" values between 0 and 3. Various complex epoxy resins of the types described above are currently available as commercial products under trade-names of several manufacturers, e.g. "Epon Resins" and are usually supplied with information concerning their epoxy and/or epoxy-plus hydroxyl equivalents. The "Epon" and analogous resins referred to hereinafter in the examples are the reaction products of epichlorhydrin and 4-4'-dihydroxy-diphenyl 2,2-propane.

The Amine Catalysts

The epoxy resin component of my coatings is cured by means of polyfunctional aliphatic, cycloaliphatic and/or aromatic amines which contain no groups other than amino groups reactive with the epoxy groups. Typical polyamines are diethylene triamine, phenylene diamine, ethylene diamine and the hydrogenated aromatic primary and/or secondary polyamines possessing at least two amino hydrogens, described in U.S. Patent 2,817,644, here incorporated by reference. The curing of the epoxy resin component by means of amine catalysts can be accomplished by mixing the two components together. The reaction occurs slowly at temperatures as low as 20° C. and faster at higher temperatures. The amount of amine catalyst can vary over a considerable range up to 50%, but we prefer amounts corresponding to between about 4% and 10% by weight on the epoxy resin solids where the latter are the bisphenolepichlorhydrin type.

*The Epoxidized Drying Oil*

Typical mass-polymerized oils which can be epoxidized for my present purposes are disclosed in U.S. Patents 2,762,851, 2,652,342, 2,559,947, 2,631,175, 2,636,910, and 2,683,162 here incorporated by reference. In general, the synthetic oils which are suitable for use as precursors of the epoxidized oil(s) are polymers of butadiene, isoprene, dimethyl butadiene, piperylene, methyl pentadiene or other conjugated diolefins having four to six carbon atoms per molecule. Instead of polymerizing any of the aforesaid diolefins alone, they may be copolymerized in admixtures with each other and/or in admixture with 0 to 40% of monocyclic vinyl aromatic monomer(s) e.g. styrene and styrenes having alkyl groups substituted on the ring such as para-methyl styrene, dimethyl styrene or diethyl styrene. We especially prefer the sodium-polymerized copolymer oils composed of 75-90% combined butadiene, balance combined styrene.

The synthetic oils can be advantageously prepared by mass polymerization either in the presence of a hydrocarbon soluble peroxide catalyst, such as benzoyl peroxide or cumene hydroperoxide, or in the presence of metallic sodium when the monomers consist of diolefin(s) or of mixture of a diolefin(s) with vinyl aromatic monomer(s). Suitable polymerization methods are illustrated below. Throughout the following description it should be understood that all proportions are expressed on a weight basis unless otherwise specified.

SYNTHESIS METHOD A

For example, 100 parts of butadiene-1,3, 50 parts of straight run mineral spirits boiling between 150 and 200° C. (Varsol), 3 parts t-butyl hydroperoxide (60% pure) and 0.75 part of diisopropyl xanthogen disulfide are heated in a closed reactor at about 90° C. for 40 hours, whereupon the residual pressure is released and unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some t-butyl alcohol. This solution of polymer is then preferably fractionated to remove the dimer and usually adjusted to 50% non-volatile matter content with mineral spirits. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways particularly as described in U.S. Patent No. 2,586,594 of Arundale et al. which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1, 3, 20 parts of styrene, 200 parts of straight run mineral spirits boiling between 150 and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers, such as dioxane. Finally, additional hydrocarbon solvent is preferably distilled off until a product containing about 50%–100% non-volatile matter is obtained.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a prefectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 250° C., preferably between 60 and 200° C., e.g., butane, benzene, xylene, naphtha, cyclohexane and the like. The diluents are usually used in amounts ranging from 50 to 500 parts per 100 parts of monomer. The reaction temperature may vary between about 40° C. and 100° C. preferably around 65 to 85° C. As a catalyst, 0.1 to 10 parts of dispersed metallic sodium is used per 100 parts of monomers, sodium particle sizes below 100 microns being particularly effective.

The polymers produced by the above process have molecular weights up to 10,000 and viscosities up to 22 poises at 50% NVM and are pale yellow to colorless liquids. The disclosure of U.S. Patent 2,762,851 is here incorporated by reference.

The oils can be epoxidized effectively by methods known to the art, such as those described in Bulletin No. 16 of the Buffalo Electrochemical Company and in U.S. Patents Nos. 2,485,160 and 2,569,502. We especially prefer, however, to use the process described in the co-pending application of Radlove and Davis, Serial No. 515,783, filed June 15, 1955. For our purposes the epoxidized drying oil should have an oxirane oxygen content of 2–7.5% by weight, and preferably should have a value between about 5% and 6% by weight.

The amount of epoxidized drying oil, based on the total weight of film forming solids in the epoxy drying oil-epoxy resin enamel, should be between about 1% and 10%. We especially prefer to use amounts between about 2% and 3% by weight.

The following examples illustrate the principles of our invention and include the best modes presently known to us for practicing those principles. Percentages and parts are by weight unless otherwise indicated.

EXAMPLE 1

Two enamels were formulated from the following materials:

| | |
|---|---|
| Aluminum pigment plus solvent (8.2 gals./100 lbs.) (66% solids in high flash naphtha) lbs__ | 0.5 |
| Epoxy resin solution_____pints__ | 2.75 |
|   Epoxy resin (Epon 1007) (100% solids; 9.56 lbs./gal.; epoxide equivalent: 1550–2000)_____lbs__ | 4 |
|   Methyl ethyl ketone (6.73 lbs./gal.)__pints__ | 2 |
|   Butyl alcohol (6.78 lbs./gal.)_____do____ | 2 |
|   Toluol (7.25 lbs./gal.)_____do____ | 4 |
| Methyl ethyl ketone_____do____ | 0.75 |
| Butyl alcohol_____do____ | 0.50 |
| Epoxy resin (EKSA 2002) solution (75% solids dissolved in toluol; epoxide equivalent of resin: 600–700; 9.1 lbs./gal.)_____pints__ | 4.0 |
| Butylated urea-formaldehyde resin solution Beetle Resin 216-8; 60% solids in butanol 30% and xylol 10%; 8.5 lbs./gal.)__liq. ozs__ | 3.0 |

A. One of the enamels was used in the following tests without change other than to add catalyst as defined below.

B. The other enamel was modified by adding four liquid ounces of epoxidized, sodium-polymerized butadiene (80%)/styrene (20%) hydrocarbon drying oil prepared in the manner of synthesis B above, which material had been epoxidized to an oxirane oxygen content of 5.6% and an acetyl value of about 30; 77% NVM in xylol; 7.75 lbs./gal. Catalyst corresponding to A was then added.

The catalyst used to cure both enamels was formulated as follows:

Polyamide resin solution (composition of Example II, U.S. Pat. 2,450,940 at 60% solids in xylol; butanol/4:1; 8.3 lbs./gal.)_____pints__ 0.25
Methyl ethyl ketone_____liq. oz__ 24
Butyl alcohol _____pints__ 2
Toluol _____do____ 4

The polyamide solution and the solvents were mixed together and then four liquid ounces of diethylene triamine (8.0 lbs./gal.) were added to complete the catalyst.

The two enamels were mixed with catalyst in a volume ratio of enamel to catalyst of 1:1. The catalyzed enamels were then applied to test panels and allowed to cure at room temperature for 8 days. Portions of the two uncatalyzed enamels were also tested for viscosity stability. The cured, coated panels were used in the tests described below:

UNCATALYZED ENAMELS

| Enamel | Initial Viscosity, sec. | 24 hour Viscosity, sec. | Increase in Viscosity, sec. |
|---|---|---|---|
| A | 20 | 24 | 4 |
| B | 20 | 26 | 6 |

PANEL TESTS

| Sample | Distilled Water Immersion |
|---|---|
| A | O.K. after 24 hours. |
| B | Do. |

| Sample | Humidity 500 hours |
|---|---|
| A | O.K. |
| B | O.K. |

| Sample | Gloss (60° Glossmeter) |
|---|---|
| A | 95°. |
| B | 95°. |

| Sample | −65° Bend Test | D″ Cracking |
|---|---|---|
| A | Failed | |
| B | Passed | 1/16″. |

| Sample | Hydrocarbon Resistance | | Lub. Oil (MIL-L-7808) |
|---|---|---|---|
| | OS-45 | Type III | |
| A | ¹4H | 4H | 4H |
| B | 4H | 4H | 4H |

¹ Pencil hardness.

| Sample | Abrasion and Pencil Hardness—Pencil Hardness | Mg. loss per 100 Cycles (17 CS Wheel) |
|---|---|---|
| A | 3H | .0050 gram. |
| B | 3H | .0058 gram. |

| Sample | Heat Test (100 Hours at 260° F.) | | | Pencil Hardness |
|---|---|---|---|---|
| | Color | Impact | Bend | |
| A | Same | O.K. | O.K. | 4H |
| B | do | O.K. | O.K. | 4H |

Thus the tests showed that the enamels with and without added epoxidized hydrocarbon drying oil possessed equal merits in all respects other than as to the −65° F. bend test, where addition of the epoxidized drying oil resulted in a passing of the test and omission resulted in failure.

Having described our invention, what we claim is:

1. An improved coating composition, the vehicle of which consists essentially of a homogeneous organic solvent solution of a blend of the following film-forming materials:

(A) polymeric polyether resinous derivatives of polyhydric phenols having alternating aromatic and aliphatic nuclei united through ether oxygen, having terminal 1,2 epoxy groups and being free of functional groups other than epoxy and hydroxyl groups, said resinous derivatives having an epoxy equivalent weight between about 170 and 3000 and an hydroxyl equivalent weight between about 85 and 200; and (B) from about 1% to about 10%, by weight on the total film-forming solids in the vehicle, of epoxidized, mass-polymerized, hydrocarbon drying oil composed essentially in combined form of 60–100% by weight of conjugated diolefin having 4 to 6 carbons per molecule, balance monocyclic vinyl aromatic compound selected from the group consisting of styrene and the 1–2 carbon ring-substituted alkylated styrenes, said drying oil having been epoxidized subsequent to its polymerization to an oxirane oxygen content between about 2% and 7.5% by weight; said coating composition being curable to a protective film when mixed with from about 4% to 50%, by weight, of polyfunctional amines which contain no groups other than amino groups reactive with epoxy groups and which are selected from the group consisting of aliphatic, cycloaliphatic and aromatic polyamines.

2. An improved coating composition as claimed in claim 1, wherein said epoxidized drying oil has been polymerized by means of metallic sodium as a polymerization catalyst, and has been epoxidized to an oxirane oxygen content between 5% and 6%, and wherein said drying oil, prior to epoxidation, was composed essentially of 75–90% combined butadiene, balance combined styrene.

3. An improved coating composition as claimed in claim 2, wherein said epoxidized drying oil amounts to between about 2% and 3% by weight on the total film-forming solids in the vehicle.

4. An improved coating composition as claimed in claim 3, wherein said epoxy resin has been prepared from epichlorhydrin and bisphenol.

5. An improved coating composition as claimed in claim 4 which includes inorganic pigment and yields a cured film which is glossy.

6. An improved coating composition as claimed in claim 1 which includes inorganic pigment and yields a cured film which is glossy.

7. A metal article coated on a surface thereof with a polyamine-cured film of coating composition as claimed in claim 1, said polyamine being a polyfunctional amine which contains no groups other than amino groups reactive with epoxy groups and which are selected from the class consisting of aliphatic, cycloaliphatic and aromatic polyamines, said polyamine being added to and mixed with the coating composition of said claim in an amount between about 4% and 50%, by weight, of said composition prior to coating said article.

8. A metal article coated on a surface thereof with a polyamine-cured film of coating composition as claimed in claim 4, said polyamine being a polyfunctional amine which contains no groups other than amino groups reactive with epoxy groups and which are selected from the class consisting of aliphatic, cycloaliphatic and aromatic polyamines, said polyamine being added to and mixed with the coating composition of said claim in an amount between about 4% and 50%, by weight, of said composition prior to coating said article.

9. A metal article coated on a surface thereof with a polyamine-cured film of coating composition as claimed in claim 5, said polyamine being a polyfunctional amine which contains no groups other than amino groups reactive with epoxy groups and which are selected from the class consisting of aliphatic, cycloaliphatic and aromatic polyamines, said polyamine being added to and mixed with the coating composition of said claim in an amount between about 4% and 50%, by weight, of said composition prior to coating said article.

10. A metal article coated on a surface thereof with a polyamine-cured film of coating composition as claimed in claim 6, said polyamine being a polyfunctional amine which contains no groups other than amino groups reactive with epoxy groups and which are selected from the class consisting of aliphatic, cycloaliphatic and aromatic polyamines, said polyamine being added to and mixed with the coating composition of said claim in an amount between about 4% and 50%, by weight, of said composition prior to coating said article.

References Cited in the file of this patent

UNITED STATES PATENTS

| | | |
|---|---|---|
| 2,645,649 | Hoffman | July 14, 1953 |
| 2,682,514 | Newey | June 29, 1954 |
| 2,825,662 | McKay et al. | Mar. 4, 1958 |
| 2,829,130 | Greenspan et al. | Apr. 1, 1958 |